United States Patent [19]

Hayashi

[11] Patent Number: 5,024,513
[45] Date of Patent: Jun. 18, 1991

[54] MICROSCOPE

[75] Inventor: George Hayashi, San Jose, Calif.

[73] Assignee: Swift Instruments, Inc., Boston, Mass.

[21] Appl. No.: 444,962

[22] Filed: Dec. 4, 1989

[51] Int. Cl.$^5$ .................. G02B 7/02; G02B 21/24
[52] U.S. Cl. ............................ 350/518; 350/521; 350/522
[58] Field of Search .................. 350/507–528, 350/320

[56] References Cited

U.S. PATENT DOCUMENTS

| 739,182 | 9/1903 | Ives | 350/513 |
|---|---|---|---|
| 1,435,025 | 11/1922 | Sommer | 350/518 |
| 2,448,974 | 9/1948 | Guttmann | 350/521 |
| 2,489,487 | 11/1949 | Richards et al. | 350/521 |
| 2,544,371 | 3/1951 | Weiser | 350/521 |
| 3,743,377 | 7/1973 | Rosenberger | 350/518 |
| 3,764,193 | 10/1973 | White | 350/518 |
| 4,003,628 | 1/1977 | Halperin | 350/521 |
| 4,232,335 | 11/1980 | Nakagawa et al. | 350/508 |
| 4,334,736 | 6/1982 | Herhert | 350/507 |

OTHER PUBLICATIONS

Benz, "Blister Electric Viewer Microscope for General Science", product literature (p. 3).
Brock Optical, "The Revolutionary Magiscope", product literature.
Bausch & Lomb, "Wide Field Tubes" and Shop Microscope, product literature (pp. 6, 9).

Primary Examiner—Bruce Y. Arnold
Assistant Examiner—Thong Nguyen
Attorney, Agent, or Firm—Fish & Richardson

[57] ABSTRACT

A microscope has a microscope stand with a specimen stage for viewing and a microscope tube mounted on the stand, the tube having an eyepiece at one end and an objective at the other end, adjacent the stage. The tube is constructed for axial adjustment to vary the position of the objective relative to a specimen on the stage, both by application of axially directed force for coarse focus adjustment and by application of rotational force for fine focus adjustment.

8 Claims, 5 Drawing Sheets

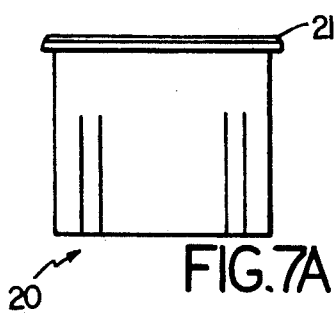
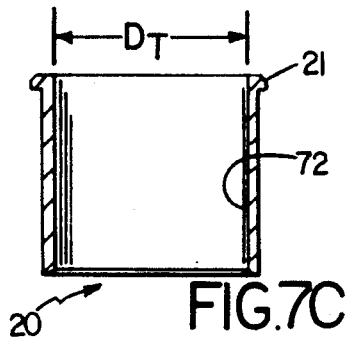
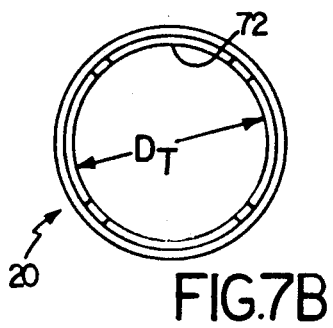
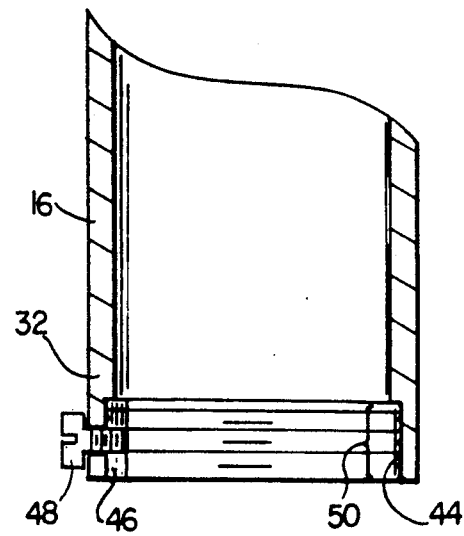
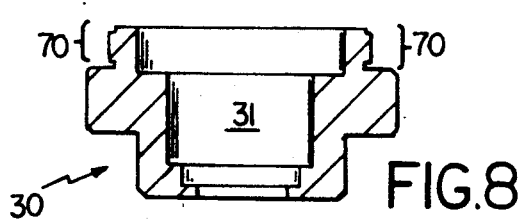
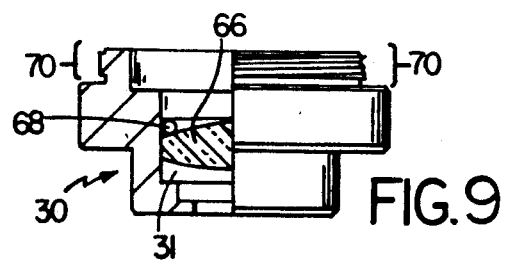
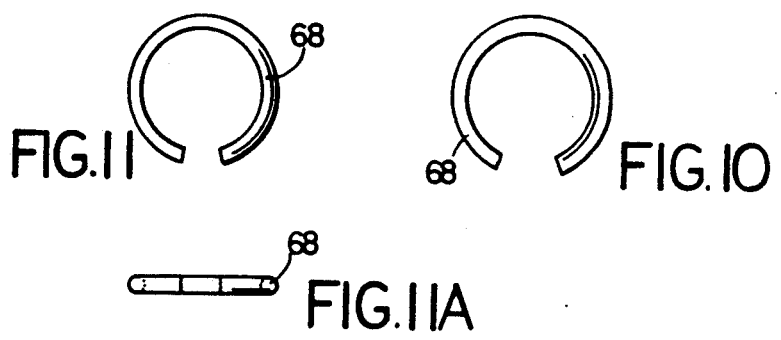

MICROSCOPE

BACKGROUND OF THE INVENTION

The invention relates to microscopes constructed to be focused by application of axial force for movement of a microscope tube having an eyepiece and objective relative to a microscope stand defining a stage upon which is disposed a specimen to be examined.

SUMMARY OF THE INVENTION

According to one aspect of the invention, a microscope comprises a microscope stand defining a specimen stage for viewing; an elongated microscope tube mounted upon the microscope stand, the elongated microscope tube having an eyepiece at a first, upper end and an objective lens at a second, lower end, the objective lens disposed generally adjacent the specimen stage; means for adjustment of the axial position of the microscope tube relative to the microscope stand in a manner to vary the position of the objective lens relative to a specimen disposed upon the specimen stage; the means for adjustment comprising a first focus element and a second focus element mounted upon the microscope stand, the first focus element adapted for axial movement relative to the second focus element upon application of axially directed force applied between the first focus element and the second focus element, the first focus element and the second focus element disposed in frictional engagement, and the means for adjustment further comprising a third focus element with the objective lens fixedly mounted thereupon, the third focus element adapted for axial movement relative to the first focus element upon application of rotational force applied between the third focus element and the first focus element, the third focus element and the first focus element disposed in threaded engagement.

Preferred embodiments of this aspect of the invention may include one or more of the following features. The microscope comprises means for securing the position of the first focus element relative to the position of the second focus element and the microscope stand, preferably the means for securing comprises means for increasing the frictional engagement of the first focus element with the second focus element to a degree sufficient to resist relative between the first focus element and the second focus element movement under axially directed force, e.g. the means for securing comprises a set screw extending in threaded engagement through the microscope stand to bear upon an outer surface of the second focus element. The second focus element comprises a tension sleeve mounted upon the microscope stand and the first focus element comprises an elongated tubular element disposed to extend coaxially through the tension sleeve. The third focus element comprises an elongated tubular element having threads about an external surface and the first focus element comprises an elongated tubular element having threads defined about an inner surface, the third focus element being disposed coaxial within the first focus element, and in threaded engagement therewith.

According to another aspect of the invention, a method for adjustment of the focus of a microscope comprising a microscope stand and, mounted in frictional and threaded engagement thereupon, a microscope tube with an eyepiece and an objective, comprises applying axially directed force to the microscope tube relative to the microscope stand to move the objective lens for coarse focus of an object to be examined; and applying rotational force to the microscope tube relative to the microscope stand to move the objective for fine focus of the object to be examined.

According to another aspect of the invention, a method for adjustment of the focus of a microscope further comprises means for securing frictional engagement of the microscope tube with the microscope stand includes an additional step, after coarse focus, of actuating the means for securing to secure the coarse focus position of the microscope; and thereafter applying rotational force to the microscope tube relative to the stand to move the objective for fine focus of the object to be examined.

Thus there is provided a microscope capable of rapid, coarse focus by application of axial force to move the objective relative to the specimen to be examined and also capable of fine focus by application of rotational force. In the preferred embodiment, the coarse focus adjustment may be preset and fixed, e.g. for use with prepared slides of predetermined focal length which only require fine focus scanning.

This improved construction offers significant advantages over so-called "draw tube" microscopes without the fine focus feature, which are used in educational and industrial applications. It has been observed that, for young hands whose motor skills are still developing, it is often difficult to execute the minute movements required for fine focus of a draw tube microscope. In the industrial applications, e.g. in the fields of gemology and surface inspection, both speed and precision are very important, and the simple draw tube microscope can not address these requirements properly.

These and other features and advantages of the invention will be seen from the following description of a presently preferred embodiment, and from the claims.

DESCRIPTION OF A PRESENTLY PREFERRED EMBODIMENT

We first briefly describe the drawings:

FIG. 6 is a side section view of the fine focus tube of the microscope tube assembly of the invention, while FIG. 6A is a similar, enlarged view of the lower end of the fine focus tube;

FIGS. 7A, 7B and 7C are side plan, bottom plan and side section views, respectively, of the tension sleeve of the microscope tube assembly of the invention; and FIG. 8 is a side section view of the objective lens housing; FIG. 9 is a side, view partially in section of the objective lens assembly; and FIG. 10 is plan view of the lens retaining ring in relaxed state; while FIGS. 11 and 11A are plan and side views of the retaining ring in tensioned state.

Figure 1:
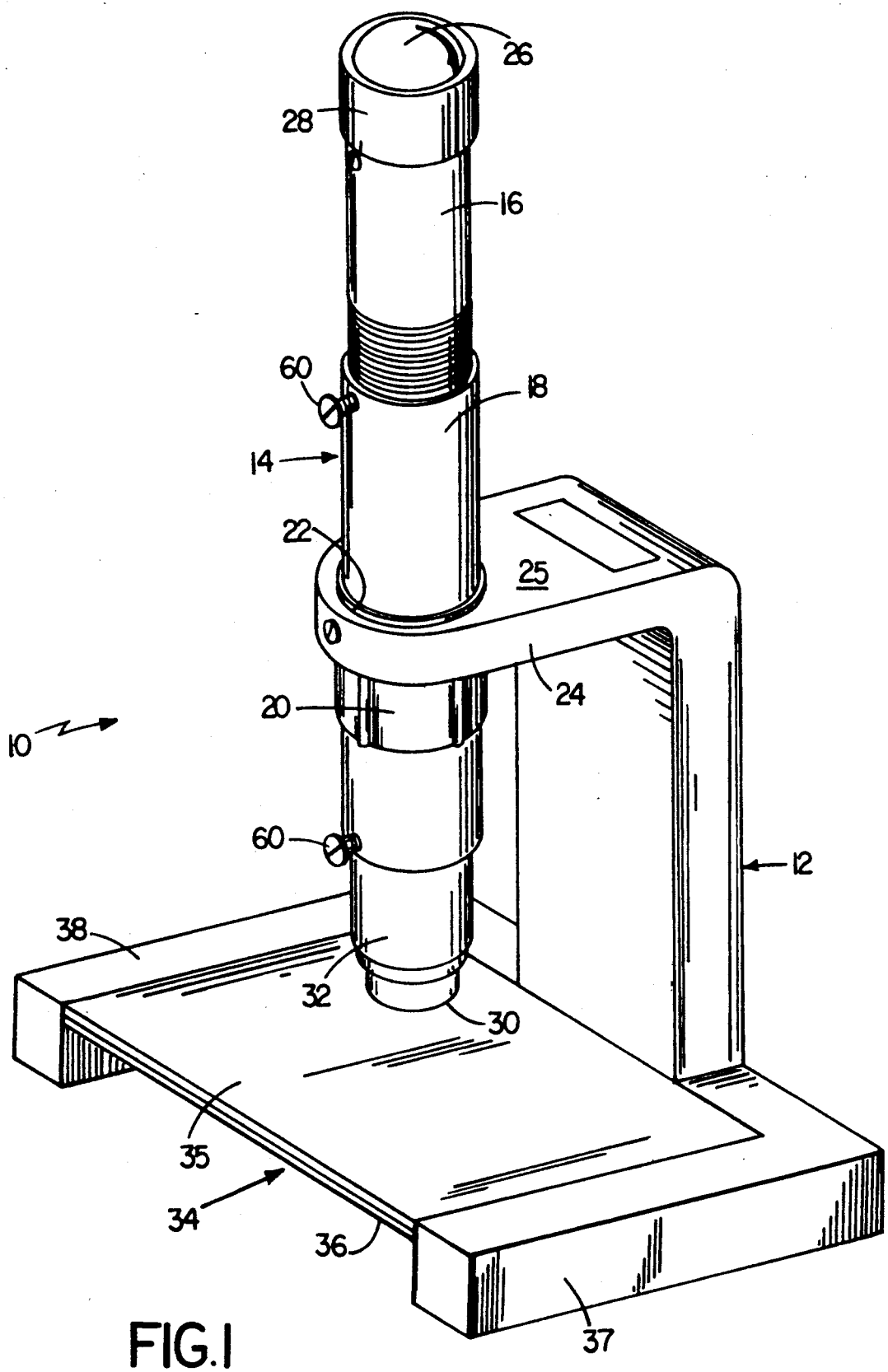
FIG. 1 is a perspective view of a microscope of the invention.
Figure 2:
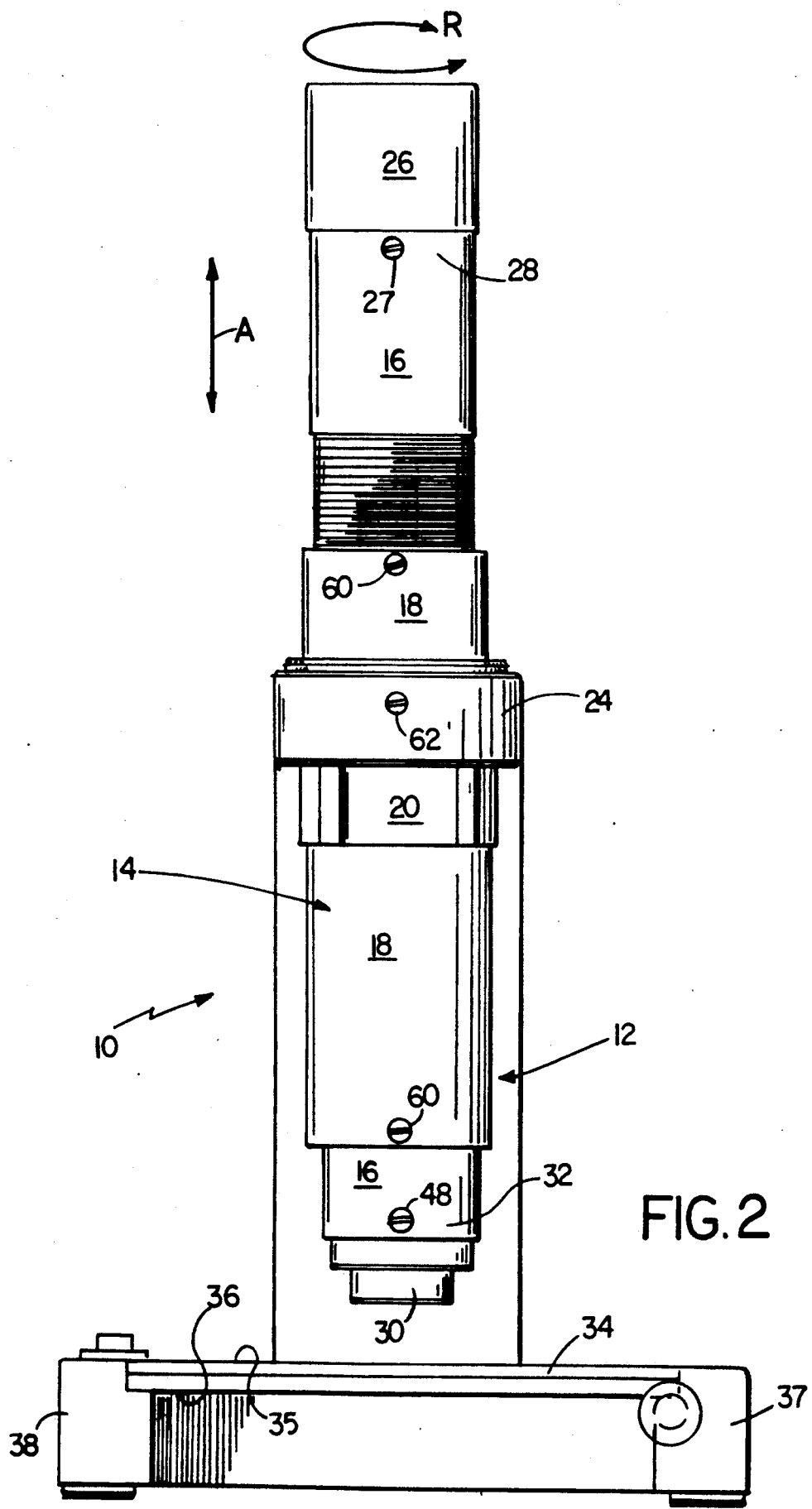
FIG. 2 is a face view of the microscope of FIG. 2.

Referring to FIGS. 1 and 2, a microscope 10 of the invention consists of a microscope stand 12 and a microscope tube assembly 14, e.g. 160 mm in length, which includes a fine focus tube 16 disposed coaxially, in threaded engagement, within a quick focus tube 18. The assembly 14 is mounted coaxially within a tension sleeve 20 disposed in orifice 22 of stand arm 24. An eyepiece 26, e.g. 10× power, is disposed in the upper end region 28 of the fine focus tube 16 and an objective housing 30 is mounted in the opposite, lower end region 32 of the fine focus tube, adjacent stage 34, e.g. a PVC (polyvinyl chloride) plastic plate having a white surface 35 and a black surface 36, reversibly mounted on legs 37, 38 of stand 12.

Figure 3:
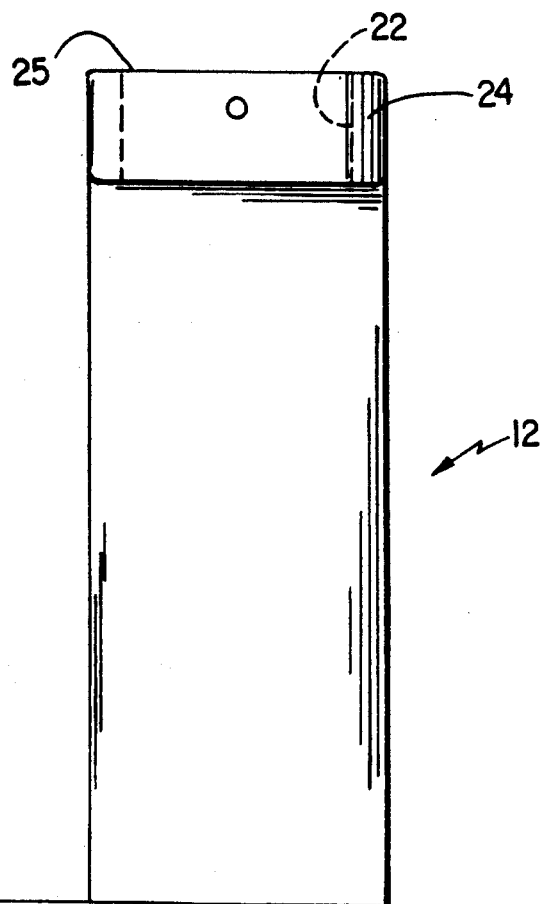
FIGS. 3 and 4 are face and bottom plan views, respectively, of the microscope stand of FIG. 1.
Figure 4:
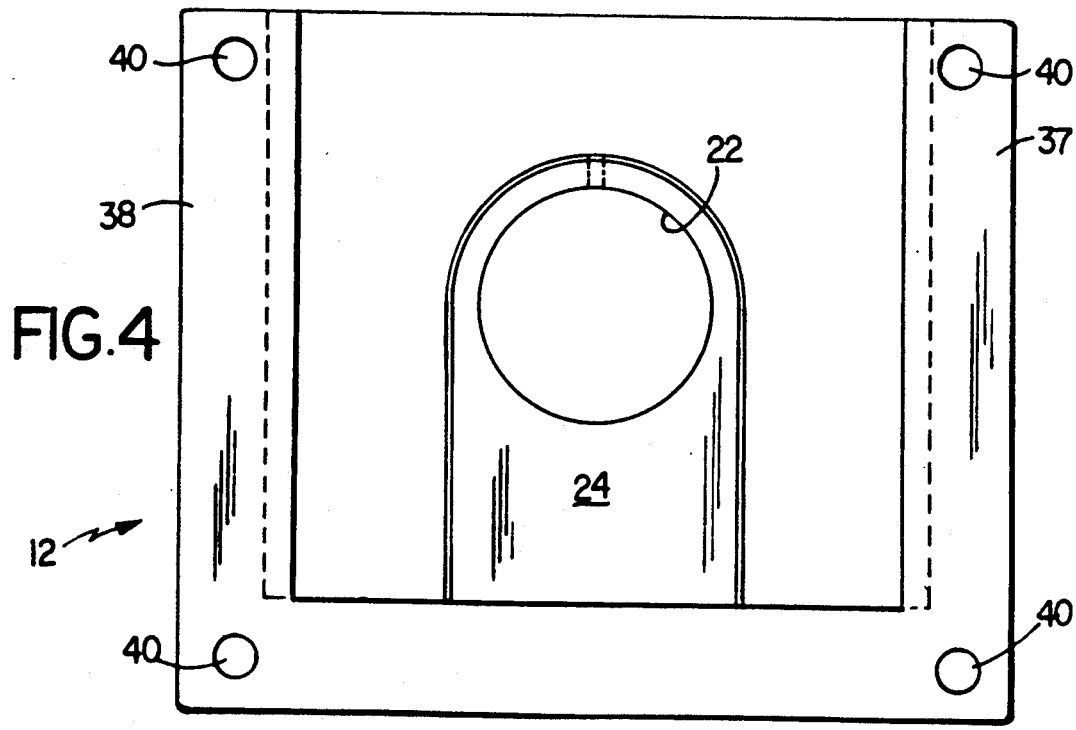

Referring also to FIGS. 3 and 4, the microscope stand 12 is typically formed of metal or plastic, and is mounted upon legs or pads 40, e.g. of rubber or plastic.

Figure 5:
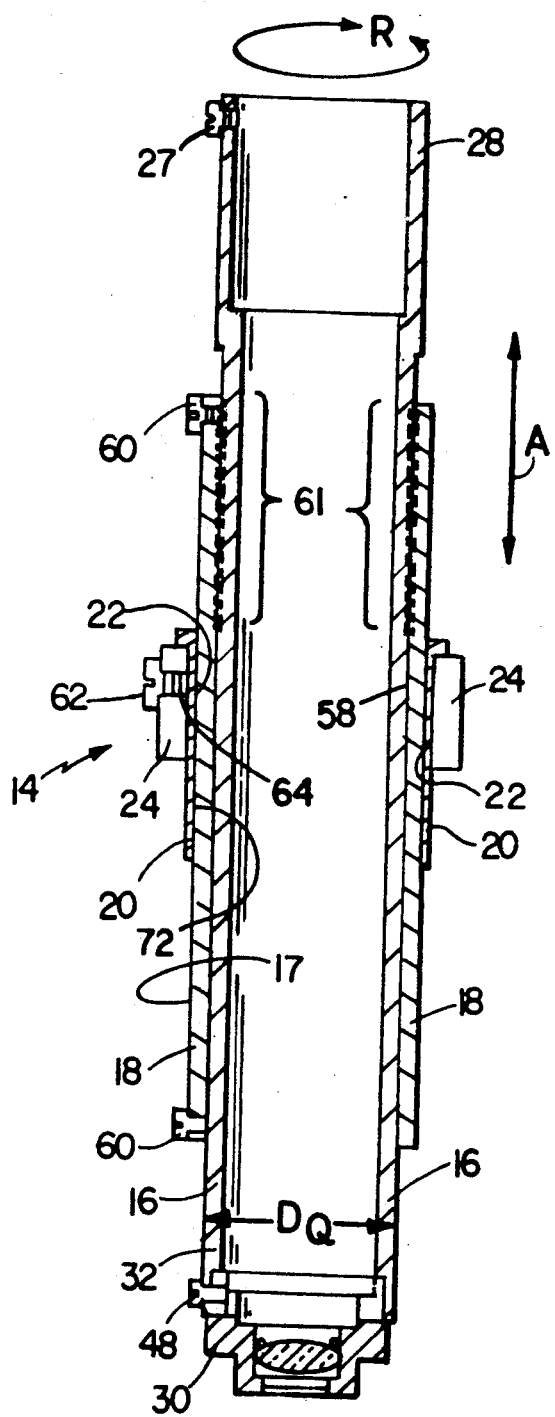
FIG. 5 is a side section view of the microscope tube assembly of the invention, mounted in the orifice of the microscope stand arm.
Figure 6:
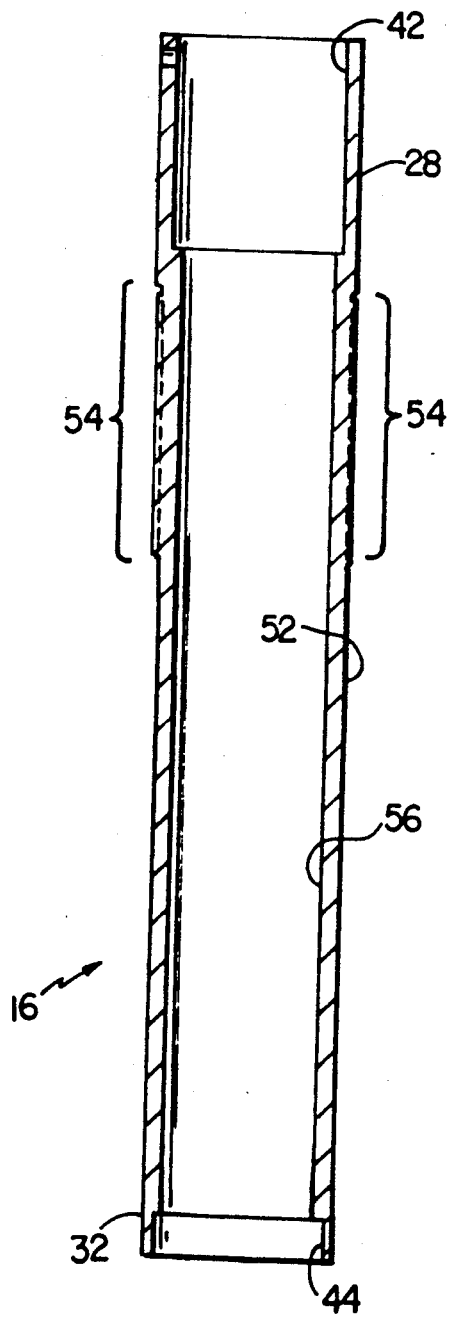

Referring now to FIG. 5, the microscope tube assembly 14 of the invention consists of fine focus tube 16, quick focus tube 18 and tension sleeve 20. The fine focus tube 16 (see also FIGS. 6 and 6A) is typically formed of a black anodized aluminum tube. The tube defines a first bore 42 in the upper end region 28 for receiving an eyepiece 26, e.g. of the type known in the art, held in place by screw 27. The fine focus tube 16 further defines a second bore 44 in the opposite, lower end region 32 for receiving a metal sleeve 46 (FIG. 6A). The sleeve 46 is glued within the bore 44 of tube 16, held in place by screw 48, and the tube 16 and sleeve 46 are tapped in region 50 for threaded engagement with objective housing 30, which will be described more fully below with reference to FIGS. 8 and 9. The outer surface 52 of the fine focus tube 16 is threaded in region 54. The inner surface 56 of the fine focus tube is typically painted anti-reflection black.

Referring again to FIG. 5, the fine focus tube 16 is disposed coaxially within quick focus tube 18, which also is formed of anodized aluminum. The inner surface 58 of the quick focus tube is tapped in the region 61 for threaded engagement with the threaded region 54 of the outer surface 52 of the fine focus tube 16. The fine focus tube 16 is movable axially (arrow A) relative to the quick focus tube 18 by rotation (arrow R) of tube 16 relative to tube 18. The fine focus tube 16 is secured against removal from quick focus tube 18 by stop screws 60.

Referring also to FIGS. 7A, 7B, and 7C, tension sleeve 20, e.g. formed of white anodized aluminum, is fixedly disposed within the orifice 22 of microscope stand arm 24, with rim 21 engaged upon the upper surface 25 of arm 24. The assembled quick focus tube 18 and fine focus tube 16 extend coaxially through the sleeve 20. The inner diameter $D_T$ of the tension sleeve 20 and the outer diameter $D_Q$ of the quick focus tube are selected to provide an interference fit, i.e. the quick focus tube 18 is held by the tension sleeve in fixed position, but the tube 18 may be moved relative to the tension sleeve by application of slight axial force (arrow A). The degree of force required for movement of the quick focus tube relative to the tension sleeve may be adjusted by means of adjustment screw 62 disposed in threaded engagement within bore 64 of microscope stand arm 24. The adjustment screw may also be tightened to a degree sufficient to prevent axial movement of quick focus tube 18 relative to sleeve 20.

Referring to FIGS. 8 and 9, the objective housing 30 is formed of aluminum and defines an inner bore 31 for lens system 66, e.g. 2.5× power, which is held in place by tensioned steel spring 68 (FIGS. 10, 11, 11A). The housing 30 is tapped in region 70 for threaded engagement with the correspondingly threaded region 50 of sleeve 46 secured in the lower region 32 of fine focus tube 16.

The microscope of the invention has particular application in education and industry. For example, a student or gemologist employing the microscope 10 of the invention places a specimen to be examined upon platform 34 (black surface 35 or white surface 36 may be selected as appropriate for the particular specimens to be studied). Axially directed force (arrow A) is applied to the assembled quick focus/fine focus tube 18, 16 to cause the outer surface 17 of the quick focus tube to slide with interference fit through the inner surface 72 of the tension sleeve 20, thereby to quickly and simply obtain coarse focus of the microscope 10. The fine focus tube 16 is then rotated (arrow R) relative to the quick focus tube 18, the threaded engagement of regions 54, 61 causing precise, accurate axial movement of the fine focus tube 16 relative to the quick focus tube 18 for fine focus of the specimen upon the platform 34. The degree of interference between the tension sleeve 20 and the quick focus tube 18 is adjusted by means of adjustment screw 62, e.g. the adjustment screw may by tightened or loosened to secure the tube 18 for movement only upon application of the desired degree of force, or may be tightened fully to prevent movement, e.g. when prepared specimens of predetermined focal length are to be studied and only fine focus scanning is required after initial coarse focus has been achieved.

Thus the microscope of the invention provides rapid, coarse focus by application of axial force to move the objective relative to the specimen to be examined and also provides fine focus by application of rotational force, offering significant advantages over prior art draw tube microscopes without the fine focus feature, in particular for young hands whose motor skills are still developing and in industry where both speed and precision are important.

These and other embodiments are within the following claims.

What is claimed is:

1. A microscope comprising:

a microscope stand defining a specimen stage for holding a specimen for viewing;

an elongated microscope tube mounted upon said microscope stand, said elongated microscope tube comprising a first focusing element and a third focusing element, and having an eyepiece lens at a first, upper end and an objective lens at a second, lower end, said objective lens disposed generally in position adjacent said specimen stage;

means for adjustment of position of said microscope tube axially along an axis of said microscope tube and relative to said microscope stand in a manner to vary the position of said objective lens relative to a specimen disposed upon said specimen stage;

said means for adjustment comprising said first focusing element and a second focusing element mounted upon said microscope stand, said first focusing element co-axial with and mounted within said second focusing element and adapted for axial movement relative to said second focusing element upon application of axially directed force applied between said first focusing element and said second focusing element, said first focusing element and said second focusing element disposed in frictional engagement, and said means for adjustment further comprising said third focusing element, said objective lens being fixedly mounted thereupon, said third focusing element co-axial with and mounted within said first focusing element and adapted for axial movement relative to said first focusing element upon application of rotational force applied between said third focusing element and said first focusing element, said third focusing element and said first focusing element disposed in threaded engagement.

2. The microscope of claim 1 further comprising means for securing said first focusing element relative to said second focusing element and said microscope stand.

3. The microscope of claim 2 wherein said means for securing comprises means for increasing the frictional engagement of said first focus element with said second focus element to a degree sufficient to resist relative between said first focus element and said second focus element movement under axially directed force.

4. The microscope of claim 3 wherein said means for securing comprises a set screw extending in threaded engagement through said microscope stand to bear upon an outer surface of said second focus element.

5. The microscope of claim 1 wherein said second focus element comprises a tension sleeve mounted upon said microscope stand and said first focus element comprises an elongated tubular element disposed to extend coaxially through said tension sleeve.

6. The microscope of claim 1 or 4 wherein said third focus element comprises an elongated tubular element having threads about an external surface and said first focus element comprises an elongated tubular element having threads defined about an inner surface, said third focus element being disposed coaxial within said first focus element, and in threaded engagement therewith.

7. A method for adjustment of position of a microscope tube, having an eyepiece lens and an objective lens, along an axis of said microscope tube and relative to a microscope stand upon which said microscope tube is mounted both in frictional and threaded engagement, in a manner to vary position of said objective lens relative to a specimen disposed upon a specimen stage, said method comprising:

applying axially directed force to said microscope tube relative to said stand to move said objective lens for coarse focus of an object to be examined; and applying rotational force to said microscope tube relative to said stand to move said objective for fine focus of the object to be examined.

8. A method for adjustment of position of a microscope tube, having an eyepiece lens and an objective lens, and means for securing frictional engagement of said microscope tube with a microscope stand, along an axis of said microscope tube and relative to said microscope stand upon which said microscope tube is mounted both in frictional and threaded engagement, said method comprising:

applying axially directed force to said microscope tube relative to said stand to move said objective lens for coarsely focusing an image of an object to be examined; actuating said means for securing the position of said microscope tube when coarsely focused; and applying rotational force to said microscope tube relative to said stand to move said objective for finely focusing the image of the object to be examined.

* * * * *